United States Patent Office 3,395,108
Patented July 30, 1968

3,395,108
MANUFACTURE OF FILLED URETHANE ELASTOMERS CURED WITH A MIXTURE OF POLYOL, INERT FILLER, MERCURIC SALT OF AN ALIPHATIC MONOCARBOXYLIC ACID AND A BASIC METAL COMPOUND
David Stanley Cobbledick, Amherst, and William D. Beauchamp, Syracuse, N.Y., assignors to Allied Chemical Corporation, New York, N.Y., a corporation of Delaware
No Drawing. Filed Sept. 30, 1964, Ser. No. 400,558
10 Claims. (Cl. 260—18)

This invention relates to novel urethane elastomers. More particularly it relates to novel filled urethane elastomers, intermediates therefor, and improvements in the preparation of filled urethane elastomers.

Non-cellular urethanes which are polymeric reaction products of organic polyisocyanates and hydroxy group containing polymers comprise a well-known class of synthetic materials. It is known to carry out the preparation of such materials at a low temperature, e.g., 65° C. and below, within a reasonable period of time, e.g., about one hour and less, by combining a reactive mixture of an organic diisocyanate, a liquid polyalkylene ether glycol having an average molecular weight between about 750 and 4500 and sufficient trifunctional co-reactant which functions to provide a cross-linked structure, the mixture having an isocyanate to hydroxyl ratio of about 0.9:1 to 1.4:1 in the presence of a metal catalyst, which accelerates the polymerization reaction and yields a solid urethane elastomer substantially free from further reactive sites.

Such urethane elastomers have been found useful as sealants for vitrified clay pipe joints. Sealants of this class generally contain inert fillers, of a kind not attacked by sewage and soil microorganisms, said fillers being added to increase the hardness and reduce the compression deflection of the urethane elastomers. These fillers are finely divided inert organic or inorganic materials and may be present in amounts up to about 60% or more by weight of the sealant composition. Although organic materials such as polystyrene can be used; inorganic materials such as aluminum silicate, rotten stone, kaolin, and the like are preferably used as a matter of economics. These finely divided materials are usually acidic in character and contain appreciable amounts of adsorbed moisture. Inasmuch as the removal of this adsorbed moisture and the preservation of the dried product in an anhydrous state or reasonably so, is somewhat tedious and expensive, these fillers as generally used may contain 0.5% or more moisture. The presence of moisture in the reactive polyisocyanate-polyol mixture presents certain problems. Not only is the well-known gas forming reaction between water and isocyanate objectionable in this instance but also many of the catalysts suggested for this reaction are sensitive to water.

Among the catalysts suggested for use in this system, notably organo-tin compounds, soluble lead, bismuth, and antimony salts of organic acids, none have proven entirely satisfactory in the particular system referred to above, i.e. the filled polyisocyanate-polyol system. The tin compounds promote oxidative degradation of the urethane polymers, the lead salts are sensitive to moisture and to acid, and salts of antimony and bismuth tend to hydrolyze and thus are somewhat less effective as accelerators than tin or lead.

It is therefore an object of this invention to devise novel curable urethane elastomer compositions comprising inert fillers which cure at normal temperatures within short periods of time.

Another object is to devise curable elastomer compositions which are not sensitive to moisture and acid.

Still another object is to devise curable urethane elastomer compositions containing fillers which possess adequate "pot life" (period before excessive viscosity increase occurs after reactants are mixed) combined with rapid curing and attainment of hardness.

Another object is to provide a process for the preparation of urethane elastomers from mixtures of diisocyanates, polyols, acidic clay fillers, and mercury catalysts.

Other objects of our invention will be obvious from the following description:

We have now made the surprising discovery that the disadvantages associated with the prior art catalyst systems can be obviated or minimized when the reaction of isocyanates and polyols in association with inert fillers, especially acidic clay fillers, is carried out in the presence of a mercury compound catalyst and additionally in the presence of an amount of an alkaline-reacting or basic metal compound sufficient to impart a pH above 6.5 to the mixture of the polyol, filler, catalyst, and alkaline compound. The combination of the following three elements is critical to our invention: (a) a mercury compound catalyst; (b) a basic metal compound; and (c) said basic metal compound being present in an amount sufficient to give the mixture of polyol, filler, catalyst, and basic compound a pH above about 6.5.

The novel compositions of our invention gel rapidly at normal temperatures and surprisingly cure in relatively short periods, i.e., they reach a relatively high degree of their ultimate hardness quickly. This latter quality of the novel compositions enables the elastomers to be removed from the mold in which they are formed relatively fast. Comparable mixtures not containing the alkaline reacting metal compound were found to be unsatisfactory.

In this description and in the claims appended hereto, the pH of a mixture is determined by dissolving 20±1 ml. of the mixture in 80±1 ml. of a solvent mixture consisting of 0.596 g. of potassium chloride, 60 ml. of methanol and 20 ml. of water (adjusted to pH of 7) and thereafter determining the pH of the resultant solution with a Beckman model N pH meter in the usual manner.

Any of a wide variety of mercury salts can be used to catalyze this reaction. Preferably mercuric salts of aliphatic monocarboxylic acids are used. Mercuric acetate, because of its effectiveness, availability and reasonable cost is especially preferred. As examples of suitable salts of mercury the following are mentioned:

| | |
|---|---|
| mercuric formate | mercuric glutarate |
| mercuric acetate | mercuric benzoate |
| mercuric isobutyrate | mercuric phenylglycinate |
| mercuric propionate | mercuric anthranilate |
| mercuric octoate | phenyl mercuric chloride |
| mercuric oleate | phenyl mercuric nitrate |
| mercuric palmitate | phenyl mercuric acetate |
| mercuric stearate | phenyl mercuric oleate |
| mercuric oxalate | mercuric naphthenate |
| mercuric adipate | mercuric hexahydrobenzoate |

Mixtures of these and equivalent salts of mercury are contemplated in this connection also.

The proportion of the mercury catalyst to be used can vary over a considerable range. Amounts as little as 0.01% give substantial acceleration to the isocyanate-polyol reaction and amounts of 5% or more (by weight of the polyol) can be used. Preferably between about 0.1 and 2% of the mercury compound is used. The optimum proportion of catalyst to be used will depend upon the particular catalyst and also upon the particular components and conditions employed.

Any alkaline reacting metal compound may serve as the curing promoter in the present instance. Preferably this component should be finely divided, and inert to attack by micro-organisms found in sewerage and soil. The metal compound should also be anhydrous, although small amounts of moisture e.g. 2 or 3% by weight can be tolerated. Thus oxides of metals such as lead oxide, zinc oxide, barium oxide, magnesium oxide, salts such as basic lead acetate, sodium carbonate, barium naphthoate, strontium propionate, magnesium carbonate, and hydroxides such as calcium hydroxide, sodium hydroxide can be used. Preferably, an oxide of an alkaline earth metal is used.

The proportion of the alkaline reacting metal compound to be used can be varied over a broad range but must be at least sufficient to impart a pH greater than 6.5, and preferably between 7 and 9, to the mixture of polyol, filler and catalyst. The most effective amount will depend to a considerable extent upon the particular reaction components and conditions employed.

The fillers employed are conventional materials designated in the art as "inert" and are finely divided and resistant to attack by sewage and soil micro-organisms. The fillers may, and usually do, contain adsorbed moisture. Thus typical examples of this component of the novel elastomer compositions include:

| | |
|---|---|
| attapulgite | calcium silicate |
| kaolin | magnesium trisilicate |
| talc | zinc sulfide |
| bentonite | barium sulfate |
| halloysite | calcium fluoride |
| aluminum silicate | titanium dioxide |

Mixtures of these and other conventional fillers can be used also.

The amounts of filler used can be varied over a broad range and will depend to a considerable extent upon the particular properties and characteristics desired in the final elastomer product. Generally the filler is added in amounts of between about 25 and 150% by weight of the polyol component, corresponding to between about 10% and about 60% by weight of the total reaction mixture.

Examples of suitable organic polyisocyanates include aliphatic diisocyanates such as hexamethylene diisocyanates, cycloaliphatic diisocyanates such as cyclohexyl-2,4-diisocyanate, 4,4' - methylene - bis(cyclohexylisocyanate), aromatic polyisocyanates such as 2,4-tolylene diisocyanate, 2,6-tolylenediisocyanate, 4,4'-methylene-bis-(phenyl isocyanate), 1,5-naphthalene diisocyanate, 4,4',4"-triphenylmethane triisocyanate, polyalkylene polyaryl polyisocyanates such as those disclosed in U.S. Patent 2,683,730, and mixtures of those and equivalent materials.

Prepolymers, i.e., reaction products of an excess of a diisocyanate with a polyol such as trimethylol propane, polyalkylene ether diols of about 400 average molecular weight, as well as isocyanate polymers of diisocyanates can be used also in place of the polyisocyanates noted above.

The amount of polyisocyanate or prepolymer used can be varied somewhat depending upon the particular characteristics of the elastomer product desired. Generally an amount sufficient to provide a ratio of isocyanato groups to hydroxyl groups of at least 0.9:1 should be used. Preferably a ratio of NCO:OH of between 1:0.1 and 1.4:1 is used.

The polyol reactant is generally a polyalkylene ether polyol having a molecular weight between about 750 and 4500. Such compounds are well known in this art and are believed to have essentially the following formula

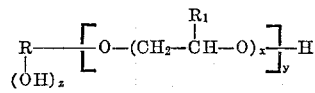

wherein R is the residue of a polyol as exemplified below; $R_1$ is hydrogen or methyl, $x$ is an integer from about 5 to about 70, $y$ is an integer 2 to 6, and $z$ is an integer 0 to 5. Such polyether polyols can be obtained in a known manner by condensation of an alkylene oxide such as ethylene oxide, 1,2-propylene oxide, 1,3-propylene oxide or mixtures thereof with polyhydric alcohols such as ethylene glycol, propylene glycol, dipropylene glycol, glycerine, trimethylol propane, 1,2,6-hexanetriol, pentaerythritol, sucrose, or mixtures thereof, in the presence of catalysts or initiators such as trialkylamines, e.g., trimethylamine, or inorganic bases, e.g., potassium hydroxide, or a metal halide, e.g., boron trifluoride. Polyether polyols derived from 1,2-propylene oxide are preferred and such polyols which are mixtures of diols and triols are especially useful. To provide a cross-linked structure when reacting a polyalkylene ether glycol with an organic diisocyanate, it is desirable to add a polyol or polyisocyanate of functionality greater than 2 as a cross-linking co-reactant, as is known in the art.

The filled urethane elastomers of this invention have particular utility as sealants for vitrified clay pipes. Materials heretofore available while capable of bearing internal pressures of up to about 250 lbs. per square inch required excessive time and careful preparation to be economically feasible.

The vitrified clay pipes are usually sealed at the pipe laying site and it has been a time-consuming procedure. Sealants previously available required considerable care to maintain substantially anhydrous conditions during the sealing process and the curing or hardening was slow, requiring about one hour to reach a state of rigidity such that the molds or forms could be removed.

The filled urethane compositions of this invention are characterized by rapid curing or hardening and are relatively insensitive to moisture during the curing stage and hence represent a definite economic advance in the field of urethane sealants.

The more detailed practice of this invention will be illustrated by the following examples in which parts and percentages are by weight and temperatures are given in degrees centigrade. The hardness test results were determined according to ASTM D-1484-59.

EXAMPLE 1

Part A.—Preparation of urethane prepolymer

A mixture of 3105 parts of 80–20 (approximate) mixture of 2,4- and 2,6-tolylene diisocyanates and 1395 parts of a propylene glycol initiated polyoxy propylene glycol, having a hydroxyl number of 380, formed by slowly adding the glycol to the warm (50°) diisocyanate, is heated at 60° to 65° for 2 to 2½ hours. The resultant mass is cooled to ambient temperature. It has a viscosity of V (Gardiner-Holt scale), an amine equivalent of 167–173.

Part B

A mixture is prepared by adding 250 parts of aluminum silicate (available under the trade designation Glomax PVR) and 6 parts of mercuric acetate to 300 parts of a blend of 3 parts of a glycerine initiated polyoxypropylene triol (hydroxyl number =83) and 1 part of a propylene glycol initiated polyoxypropylene diol (hydroxyl number =84) and dispersing the mass in a Kady mill for 4 minutes. This mixture is identified below as mixture #1.

Mixtures #2, #3 and #4 are prepared by adding 250 parts of aluminum silicate and 6 parts of litharge (mixture #2), 6 parts of basic lead acetate (mixture #3), 6 parts of lead naphthenate (mixture #4) to 300 parts of the polyol blend and the mixture is dispersed in a Kady mill for 4 minutes. Thereafter 3 parts of mercuric acetate are added and the mass agitated in the mill for an additional 2 minutes.

To 150 parts of each of the above mixtures 20 parts of the urethane prepolymer are added and thoroughly mixed. The mixture is then poured into a 4" x 1" test tube and a thermometer suspended in the reacting mass. The exotherm and gel times are determined. The cure rate is determined by filling a preheated (38°) aluminum dish with the reacting mixture and placing the dish in a 38° oven. At intervals of 10 minutes, 20 minutes and 1 hour, the dish is removed and the hardness of the elastomer is determined.

The data obtained are recorded in Table 1 below.

TABLE 1

| Mixture | Exotherm, degrees/interval | | | | | | | Gel Time (min.) | Curing Rate, hardness 1/interval | | |
|---|---|---|---|---|---|---|---|---|---|---|---|
| | 2 min. | 3 min. | 4 min. | 5 min. | 6 min. | 7 min. | 8 min. | | 10 min. | 20 min. | 1 hr. |
| #1 | 38 | 41.5 | 43 | 43 | 43 | 43 | 43 | 8.0 | 12 | 52 | 66 |
| #2 | 37 | 42 | 45 | 46 | (²) | (²) | (²) | 5.5 | 53 | 66 | 70 |
| #3 | 41 | 46.5 | 48 | 48 | (²) | (²) | (²) | 4.5 | 50 | 64 | 68 |
| #4 | 40.5 | 45 | 46.5 | 46.5 | 46 | (²) | (²) | 5.5 | 40 | 59 | 67 |

¹ Durometer Readings D Scale. ² Not determined.

TABLE 2

| Catalyst | Water, percent | Exotherm, degrees/interval | | | | | | | Gel Time, min. |
|---|---|---|---|---|---|---|---|---|---|
| | | 2 min. | 3 min. | 4 min. | 5 min. | 6 min. | 7 min. | 8 min. | |
| Lead Octoate | 0 | 46.5 | 52.5 | 55 | 55 | (¹) | (¹) | (¹) | 5.5. |
| Lead Octoate | 0.5 | 36 | 41.5 | 45.5 | 49.5 | (¹) | (¹) | 49 | No gelation in 1 hour. |
| Lead Naphthenate | 0 | 46.5 | 53 | 55.5 | 56 | 55 | (¹) | (¹) | 6.0. |
| Lead Naphthenate | 0.5 | 40 | 45 | 48.5 | 50.5 | 50.5 | (¹) | 48 | No gelation in 1 hour. |
| Mercuric Acetate | 1.0 | 46.5 | 53 | 55.5 | 56 | (¹) | (¹) | (¹) | 5.0. |

¹ Not determined.

The pH of mixture #1 prior to admixture with the prepolymer is 6.4. The pH of the mixtures 3 and 4 is 7.1, that of mixture #2 is 8.2.

As can be seen from these data, mixture #1, which does not contain any alkaline reacting metal salt, is relatively slow reacting and cures very slowly. On the other hand, mixtures 2, 3 and 4, which do include sufficient alkaline reacting metal compound to render the mixture alkaline, react and cure rapidly, so rapidly in fact that they could have been removed from the molds after about 10 minutes without damage.

EXAMPLE 2

The procedure described for mixture #3 in Example 1 Part B above is repeated except that 3 parts of basic lead silicate are used in place of 6 parts of basic lead acetate and 2 parts instead of 3 parts of mercuric acetate are used.

The resultant mixture gels in 4.5 minutes and its curing rate is as follows

Hardness 45 after 10 minutes
Hardness 52 after 20 minutes
Hardness 55 after 1 hour.

EXAMPLE 3

The procedure of Example 2 above is repeated using 1 part of magnesium oxide in place of 3 parts of basic lead silicate as the curing accelerator. The resulting mixture has a pH of 8.9 and after addition of the prepolymer gels in 3.5 minutes. The curing rate also is rapid as indicated by the data Hardness 64 after 10 minutes
Hardness 71 after 20 minutes
Hardness 72 after 1 hour.

EXAMPLE 4

This experiment illustrates the difference in the sensitivity of lead catalysts and mercury catalysts to water in the urethane elastomer systems.

A mixture of 300 parts of the polyether blend used in the above examples and 1.5 parts of water is prepared and to it is added 0.6 part of lead octoate. Then 80 parts of the urethane prepolymer prepared in Example 1 Part A above are added and the exotherm and curing rate of the mixtures are determined as described in Example 1, Part B above. The data are given in Table 2 below.

The above procedure is repeated using an equal weight of lead naphthenate in place of lead octoate. Similarly, a reactive mixture is prepared using 3 parts of mercuric acetate in place of 0.6 part of lead salt.

For comparison, analogous mixtures containing the lead catalysts are prepared to which no water was added.

The exotherms and curing rates of all these mixtures are set out in Table 2 below.

In the present invention using mercury compound catalysts water in small amounts of 2% or less (by weight of the total mixture) has no adverse effect whereas other catalysts yield inferior results with or without the presence of water. The process of the invention using mercury compound catalysts is, therefore, of great commercial advantage since it is economically unfeasible to prevent water from entering the reaction mixture and to use anhydrous fillers.

EXAMPLE 5

A mixture of 400 parts of the polyol blend used in Example 1 Part B above, 333 parts of aluminum silicate is dispersed in a Kady mill for four minutes and then 8.0 parts of phenyl mercuric oleate are added and mixed with the dispersion for two minutes thereafter. The pH of this composition was 5.8. A mixture of 150 parts of this composition and 20 parts of the urethane prepolymer prepared in Example 1 Part A above requires 12 minutes to gel and has a hardness of 63 after 24 hours.

The foregoing procedure is repeated except that in addition 0.33% by weight of MgO is admixed with the polyol blend and aluminum silicate. The composition thus obtained has a pH of 6.6 and, after admixture with urethane prepolymer, requires 11 minutes to gel and hardens more rapidly than the above composition.

By increasing the MgO content to 1.0% of the polyol, the pH of the composition is increased to 7.3. This composition when admixed with the polyisocyanate component gels in 6.5 minutes, and hardens more rapidly than either of the preceding mixtures.

It can thus be seen that novel effective and readily prepared filled urethane elastomer compositions which cure rapidly and completely at ambient temperatures have been devised.

Our invention has been described and illustrated by means of several purely illustrative examples. As will be readily apparent to those skilled in this art, our invention is not limited to the details set out in these examples but is subject to considerable variation without departing from the scope or spirit of this invention which is limited only by the claims appended hereto.

We claim:
1. A composition of matter adapted for admixture with an organic polyisocyanate to produce a filled curable urethane elastomer comprising a polyalkylene ether polyol, an inert filler, a mercuric salt of an aliphatic monocarboxylic acid capable of catalyzing a reaction of said polyol with said polyisocyanate, and a basic metal compound selected from the group consisting of lead oxide, zinc oxide, barium oxide, magnesium oxide, basic lead acetate, sodium carbonate, barium naphthoate, strontium propionate, magnesium carbonate, calcium hydroxide and sodium hydroxide in an amount sufficient to give the composition a pH between about 6.5 and about 9.

2. The composition of matter as defined in claim 1 wherein the basic metal compound is present in an amount sufficient to give the composition a pH of about 7 to about 9.

3. The composition of matter as defined in claim 1 wherein the basic metal compound is an oxide of an alkaline earth metal.

4. The composition of matter as defined in claim 1 wherein the mercuric salt is present in an amount ranging from about 0.01% to about 5% by weight of polyol.

5. A composition of matter adapted for admixture with an organic polyisocyanate to produce a filled curable urethane elastomer comprising a polyalkylene ether polyol having an average molecular weight of about 750 to about 4500, an inert filler in an amount ranging from 25% to about 150% by weight of the polyol, a mercuric salt of an aliphatic monocarboxylic acid capable of catalyzing a reaction of said polyol with said polyisocyanate, the mercuric salt being present in an amount ranging from 0.01% to about 5% by weight of the polyol, and a basic metal compound selected from the group consisting of lead oxide, zinc oxide, barium oxide, magnesium oxide, basic lead acetate, sodium carbonate, barium naphthoate, strontium propionate, magnesium carbonate, calcium hydroxide and sodium hydroxide in an amount sufficient to give the composition a pH between about 7 to about 9.

6. A process for producing a filled urethane elastomer comprising admixing an organic polyisocyanate with a composition of matter comprising a polyalkylene ether polyol, an inert filler, a mercuric salt of an aliphatic monocarboxylic acid catalyst, and a basic metal compound selected from the group consisting of lead oxide, zinc oxide, barium oxide, magnesium oxide, basic lead acetate, sodium carbonate, barium naphthoate, strontium propionate, magnesium carbonate, calcium hydroxide and sodium hydroxide in an amount sufficient to give the composition of matter a pH between about 6.5 and about 9.

7. A process for producing a filled urethane elastomer as defined in claim 6 wherein the basic metal compound is present in an amount sufficient to give the composition a pH of about 7 to about 9.

8. A process for producing a filled urethane elastomer as defined in claim 6 wherein the basic metal compound is an oxide of an alkaline earth metal.

9. A process for producing a filled urethane elastomer as defined in claim 6 wherein the organic polyisocyanate is an aromatic diisocyanate.

10. A process for producing a filled urethane elastomer comprising admixing an aromatic diisocyanate with a composition of matter comprising a polyalkylene ether polyol having an average molecular weight of 750 to about 4500, an inert filler in an amount ranging from about 10% to about 60% by weight of the total mixture, a mercuric salt of an aliphatic monocarboxylic acid catalyst in an amount ranging from about 0.01% to about 5% by weight of the polyol, and a basic metal compound selected from the group consisting of lead oxide, zinc oxide, barium oxide, magnesium oxide, basic lead acetate, sodium carbonate, barium naphthoate, strontium propionate, magnesium carbonate, calcium hydroxide and sodium hydroxide in an amount sufficient to give the composition a pH of about 7 to about 9 wherein the proportions of the composition of matter and the aromatic diisocyanate are such as to provide an NCO/OH ratio in the range of about 0.9:1 to about 1.4:1.

References Cited

UNITED STATES PATENTS

| | | | |
|---|---|---|---|
| 2,948,691 | 8/1960 | Windemuth et al. | 260—2.5 |
| 3,201,136 | 8/1965 | Harrison et al. | 260—77.5 |
| 3,226,354 | 12/1965 | Heiss | 260—77.5 |

FOREIGN PATENTS

| | | |
|---|---|---|
| 909,358 | 10/1962 | Great Britain. |
| 970,497 | 9/1964 | Great Britain. |
| 673,263 | 10/1963 | Canada. |
| 655,550 | 1/1963 | Canada. |

DONALD E. CZAJA, *Primary Examiner.*

LEON J. BERCOVITZ, *Examiner.*

C. W. IVY, *Assistant Examiner.*